US009397900B2

(12) United States Patent
Cheng

(10) Patent No.: US 9,397,900 B2
(45) Date of Patent: Jul. 19, 2016

(54) METHODS AND APPARATUS FOR SHARING COUNTER RESOURCES BETWEEN COS/PRIORITY OR/AND BETWEEN EVC/VLAN TO SUPPORT FRAME LOSS MEASUREMENT

(75) Inventor: Weiying Cheng, Naperville, IL (US)

(73) Assignee: Coriant Operations, Inc., Naperville, IL (US)

( * ) Notice: Subject to any disclaimer, the term of this patent is extended or adjusted under 35 U.S.C. 154(b) by 646 days.

(21) Appl. No.: 12/891,325

(22) Filed: Sep. 27, 2010

(65) Prior Publication Data
US 2012/0076013 A1 Mar. 29, 2012

(51) Int. Cl.
| H04L 12/26 | (2006.01) |
| H04L 12/24 | (2006.01) |
| H04L 12/46 | (2006.01) |
| G06F 11/00 | (2006.01) |

(52) U.S. Cl.
CPC ........ H04L 41/5038 (2013.01); H04L 12/4641 (2013.01); H04L 43/0829 (2013.01)

(58) Field of Classification Search
CPC . H04L 12/28; H04L 12/4641; H04L 41/5038; H04L 43/0829; G06F 11/30
USPC ...................... 370/229, 236–238, 241.1, 252; 709/208, 223, 224, 238, 248
See application file for complete search history.

(56) References Cited

U.S. PATENT DOCUMENTS

| 6,229,813 | B1 * | 5/2001 | Buchko | ................. | H04J 3/1682 |
| | | | | | 370/235 |
| 6,366,563 | B1 * | 4/2002 | Weldon | ............... | H04L 12/2697 |
| | | | | | 370/252 |
| 7,760,738 | B1 * | 7/2010 | Chamas | .............. | H04L 12/4675 |
| | | | | | 370/238 |
| 8,229,705 | B1 * | 7/2012 | Mizrahi et al. | ................ | 702/182 |
| 8,488,489 | B2 * | 7/2013 | Manzella | ...................... | 370/254 |
| 2003/0223377 | A1 * | 12/2003 | Simmons et al. | ............. | 370/254 |
| 2004/0261116 | A1 * | 12/2004 | Mckeown | ............... | H04L 12/24 |
| | | | | | 725/109 |
| 2005/0025148 | A1 * | 2/2005 | Johansson | ........... | H04L 12/4641 |
| | | | | | 370/389 |
| 2005/0120089 | A1 * | 6/2005 | Kang | .................. | H04L 12/4645 |
| | | | | | 709/213 |
| 2006/0039390 | A1 * | 2/2006 | Boyd | .................. | H04L 12/4641 |
| | | | | | 370/404 |
| 2006/0123204 | A1 * | 6/2006 | Brown et al. | ................. | 711/153 |
| 2006/0268925 | A1 * | 11/2006 | Sarkar | ........................... | 370/447 |
| 2007/0121504 | A1 * | 5/2007 | Hellenthal | .......... | H04L 12/5693 |
| | | | | | 370/230 |
| 2007/0195762 | A1 * | 8/2007 | Choi | ....................... | H04L 47/10 |
| | | | | | 370/389 |

(Continued)

OTHER PUBLICATIONS

"Series Y: Global Information Infrastructure, Internet Protocol Aspects and Next-Generation Networks," ITU-T Recommendation Y.1731, 80 pages (May 2006).

(Continued)

Primary Examiner — Alina N Boutah
(74) Attorney, Agent, or Firm — Hamilton, Brook, Smith & Reynolds, P.C.

(57) ABSTRACT

Embodiments including methods, apparatuses, and computer program products for calculating frame parameters for the purpose of measuring performance in a network based on the calculated frame parameters are disclosed. By automatically or manually provisioning at least two network elements in a star or other network topology to transmit and receive service frames (e.g., Loss Measurement Messages or Loss Measurement Responses), the embodiments enable network elements to share network resources, such as frame counters, thereby decreasing the number of frame counters needed to perform frame parameter measurements and increasing scalability for a given counter resource supported by a low cost network processor units.

21 Claims, 9 Drawing Sheets

(56) References Cited

U.S. PATENT DOCUMENTS

| | | | |
|---|---|---|---|
| 2007/0263535 A1* | 11/2007 | Shabtay | H04L 12/66 370/230 |
| 2007/0268823 A1* | 11/2007 | Madison | H04L 47/10 370/229 |
| 2008/0049629 A1* | 2/2008 | Morrill | H04L 12/24 370/250 |
| 2008/0137557 A1* | 6/2008 | Nozue | H04L 12/462 370/256 |
| 2010/0115096 A1* | 5/2010 | Eruchimovitch et al. | 709/226 |
| 2010/0172264 A1* | 7/2010 | Jones | H04L 12/5693 370/252 |
| 2011/0023090 A1* | 1/2011 | Asati | H04L 12/4633 726/4 |
| 2011/0194426 A1* | 8/2011 | Fang | H04L 47/20 370/252 |

OTHER PUBLICATIONS

"IEEE Standard for Local and Metropolitan Area Networks—Virtual Bridged Local Area Networks Amendment 10: Provider Backbone Bridge Traffic Engineering," IEEE Std 802.1Qay, 144 pages (2009).

* cited by examiner

STAR TOPOLOGY

FLOW CHART: NETWORK ELEMENT (SLAVE) IN NON-READY STATE

METHODS AND APPARATUS FOR SHARING COUNTER RESOURCES BETWEEN COS/PRIORITY OR/AND BETWEEN EVC/VLAN TO SUPPORT FRAME LOSS MEASUREMENT

BACKGROUND OF THE INVENTION

Operations, Administration, and Management (OAM) is a general term used to describe activities, processes, tools, and standards that are involved with operating, administering, and managing a network. OAM may be employed for performance monitoring, as defined in ITU-T Rec. Y.7131 (May/2006) (hereinafter "Y.7131"), such as frame loss, frame loss ratio, frame delay, or frame delay variation, in order to assist with service and capacity planning.

Specifically, such OAM functions allow for the measurement of different performance parameters, which may be used for point-to-point Ethernet connections. Performance parameters, such as frame loss ratio, frame delay, or frame delay variation, are applicable to service frames, which conform to a level of bandwidth profile at an ingress Ethernet flow point of a point-to-point Ethernet connection to be delivered to an egress Ethernet flow point. As defined in Y.1731, frame loss ratio is defined as a ratio, expressed as a percentage, of the number of service frames not delivered divided by the total number of service frames during a time interval, where the number of service frames not delivered is the difference between the number of service frames arriving at the ingress Ethernet flow point and the number of service frames delivered to the egress Ethernet flow point in the point-to-point Ethernet connection. Also defined in Y.1731, frame loss measurement may be used to collect counter values applicable for ingress and egress service frames where network resources, such as counters, maintain a count of transmitted and received data frames between pairs of network elements.

Frame loss may be generally measured by transmitting frames with information from a network element to a peer network element, followed by receiving return frames with information of both the first network element and its peer network element from the peer network element in order to calculate both a near-end frame loss measurement and far-end frame loss measurement, where near-end frame loss is associated with frame loss from the ingress data frames and far-end frame loss is associated with frame loss from the egress data frames.

SUMMARY OF THE INVENTION

Embodiments of the present invention include methods, network elements, and computer program products to calculate frame parameters, such as frame loss and frame loss ratio in a Ethernet Virtual Connection (EVC) based on shared limited network element resources, such as counters, for a plurality of priorities of the EVC to improve scalability. In one example embodiment, a first network element (NE) transmits a message with information obtained from a shared resource of the first NE to a specific second NE, for a priority and an EVC. The second NE transmits a second message with information recorded from the first message and the information obtained from the shared resource of the second NE, to the first NE. Upon receiving a sufficient number of messages at the first NE from the second NE, the first NE calculates frame parameters, such as frame loss and frame loss ratio, for this priority and this EVC. Repeating these based on the same shared limited resource, it is possible to calculate frame loss and frame loss ratio for each priority and each EVC to measure the network performance.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

Figure 1:
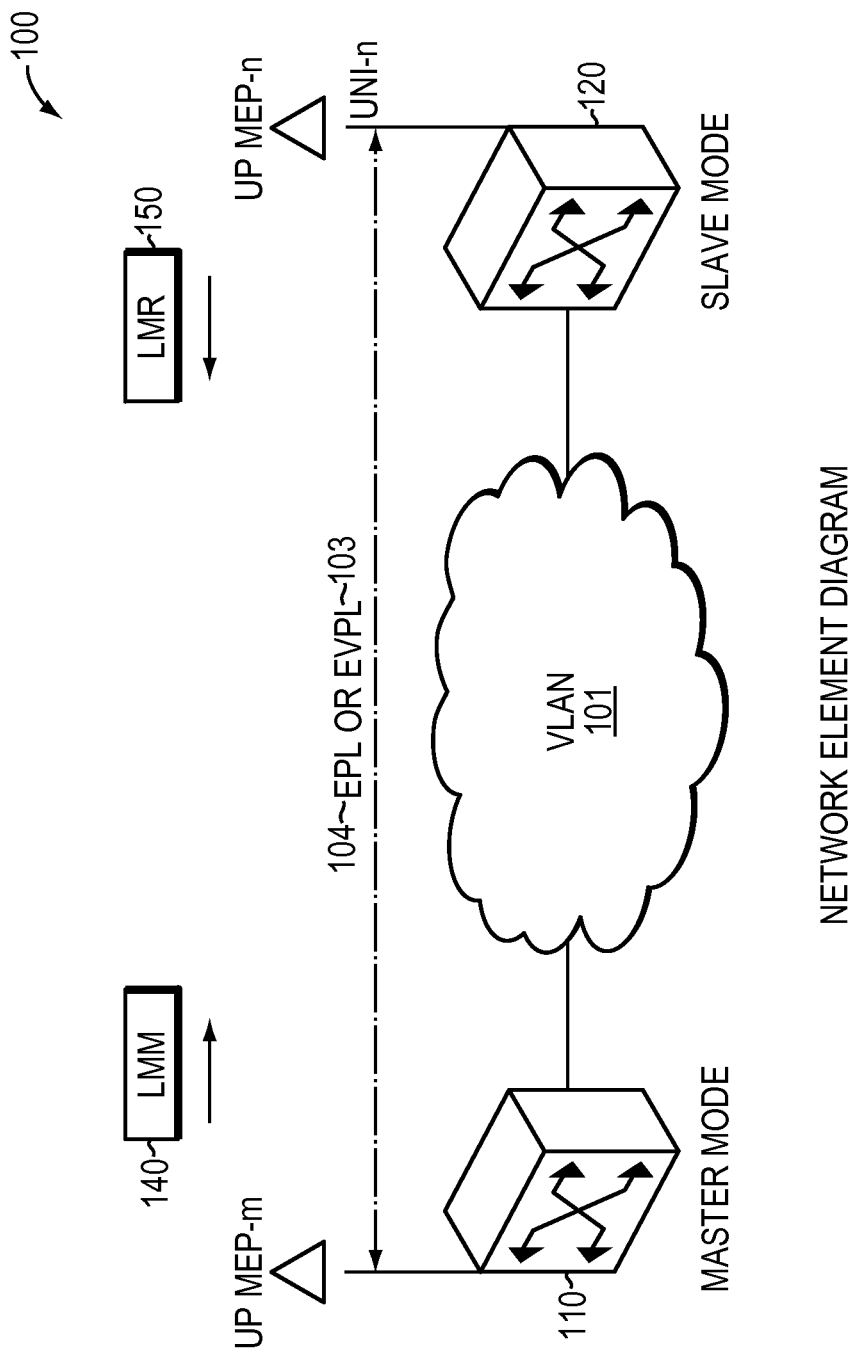
FIG. 1 is a network diagram including multiple network elements connected via a virtual local area network.

A description of example embodiments of the invention follows.

In order to measure frame loss and frame loss ratio, it is necessary to count the number of frames transmitted and the number of frames received per Class of Service (CoS) or priority and per Ethernet Virtual Connection (EVC) or Virtual Local Area Network (VLAN). As used herein, "EVCs" may include or refer to, for example, a type of EVC such as a Virtual Local Area Network (VLAN), or other types of EVCs as may apply. Also as used herein, the term "priorities" may include, be based on, or refer to, for example, class of service (CoS), or other type of priority as may apply. The terms "EVC" and "VLAN" and the terms "priority" and "CoS" may be referred to herein separately as may be appropriate for different example embodiments.

Priorities may be configured for an outbound packet, such as priorities as 0 through 7, which are then sent to a port, where the priority determines which outbound queue the packet uses. For example, the single ended frame loss measurement method defined in Y.1731 PM needs 16N such counters for N EVCs with 8 priorities; in other words, the current approach in the art to measuring frame loss or frame loss ratio requires an increased number of counters (16 times) for each EVC with 8 priorities, such that for 8 EVCs with 8 priorities, 128 counters would be required to measure frame loss and frame loss ratio.

Prior approaches to the frame loss measurement problem as described in Y.1731, which discloses the standard for determining frame loss measurement, fails to remedy the scalability requirement since multiple counters are needed per EVC (e.g., 16 counters). The standard describes each Maintenance Entity Group End Point (MEP), such as an end point of a maintenance entity group that is capable of initiating and terminating OAM frames for fault management and performance monitoring, on a network maintaining two local counters for each peer MEP and for each priority being monitored in a point-to-point maintenance entity, assuming sufficient number of counters are supported. However, such a standard fails to meet customer expectations because most low cost Network Processor Units (NPU) only support a limited number of counters, which restricts the ability to support frame loss measurement to the very limited number of priorities and EVCs.

Therefore, prior approaches in the industry have failed to solve this problem due to the inadequacies of requiring a set of two counters per EVC per priority, assuming the NPU has sufficient resources to support those counters; therefore, any implementation per Y.1731 assumptions and specifications is expensive, burdensome, and leads to customer dissatisfaction.

Disclosed example embodiments generally include methods, network elements, and computer program products for sharing counter resources between priorities, specifying priority values, such that frame loss and frame loss ratio may be measured using fewer network resources, such as counters, for the same, or more, EVCs. Example embodiments may serve to share limited network element resources, such as counters, between priorities and between EVCs within a network or plurality of networks.

Networks in which embodiments of the present invention may be employed include any known or future developed network topology, such as a star topology, tree topology, mesh topology or ring topology, where the network includes at least two network elements.

Sharing frame counters between priorities can increase the number of EVCs to have frame loss and frame loss ratio measured without increasing the number of counters needed to perform the functions (e.g., 2 N counters for N EVCs are necessary, which is significantly less than the required number of counters as in the current industry standard). To increase further the number of EVCs to have frame loss and frame loss ratio measured for a given number of counters supported by the NPU, sharing counters between priorities and between EVCs is advantageous over the current standard. Advantages of example embodiments of the present invention include an increase in scalability for a given counter resource supported by a low cost NPU, which can, in turn, reduce the costs.

Frame loss measurement and its corresponding frame loss ratio measurement are supported by a pair of network elements (NEs). One of the pair of NEs may behave like a master NE and can transmit (OAM frames (e.g., Loss Measurement Messages (LMMs)) to a peer NE with the counted number of frames received and the counted number of frames transmitted encoded in the LMM. The other of the pair of NEs, the peer of the master, may receive LMMs, may add its counted frames transmitted and counted frames received encoded, and may transmit a Loss Measurement Reply (LMR) to the master NE, including at least some of the counted frame information. Finally, the master NE calculates frame loss and frame loss ratio based on the received LMR from the peer NE.

Example embodiments described herein define methods, apparatuses, and computer program products to share counter resources between priorities and between EVCs to collect samples of frame parameters, such as frame loss and/or frame loss ratio, within a given time interval.

FIG. 1 is a network diagram including an example network 100 in which an embodiment of the present invention may be employed. The network 100 includes a Virtual Local Area Network (VLAN) 101, where the VLAN is a type of EVC, but, alternatively, can include other types of EVCs or an EVC (not shown), which may serve as an interface between two network elements, NE 110 and NE 120, such as end points of network entities. In the example embodiment of FIG. 1, NE 110 is depicted in master mode and NE 120 is depicted in slave mode; however, any NE on a network may be configured or provisioned, either manually or automatically, as a master NE or a slave NE. NE 110 and NE 120 may be connected by a suitable line, for example an Ethernet Virtual Private Line (EVPL) 103 used as a data service providing point-to-point Ethernet connection between a pair of User-Network Interfaces (UNIs) or an Ethernet Private Line (EPL) 104 service, used as a data service via point-to-point EVC, which, generally, has an expectation of low frame loss ratio. Alternatively, network elements may be connected by a suitable connection line either currently known in the art or other similar connections available in the future. While only NE 110 and NE 120 are depicted in FIG. 1, it should be known by a person of ordinary skill in the art that additional network elements may be configured in a similar manner.

FIG. 1 further illustrates an example of transmitting at least two LMM frames 140 from the NE 110 and receiving at least two LMR frames 150 at NE 110 from the NE 120, as is disclosed in more detail below in reference to FIG. 2.

Figure 2:
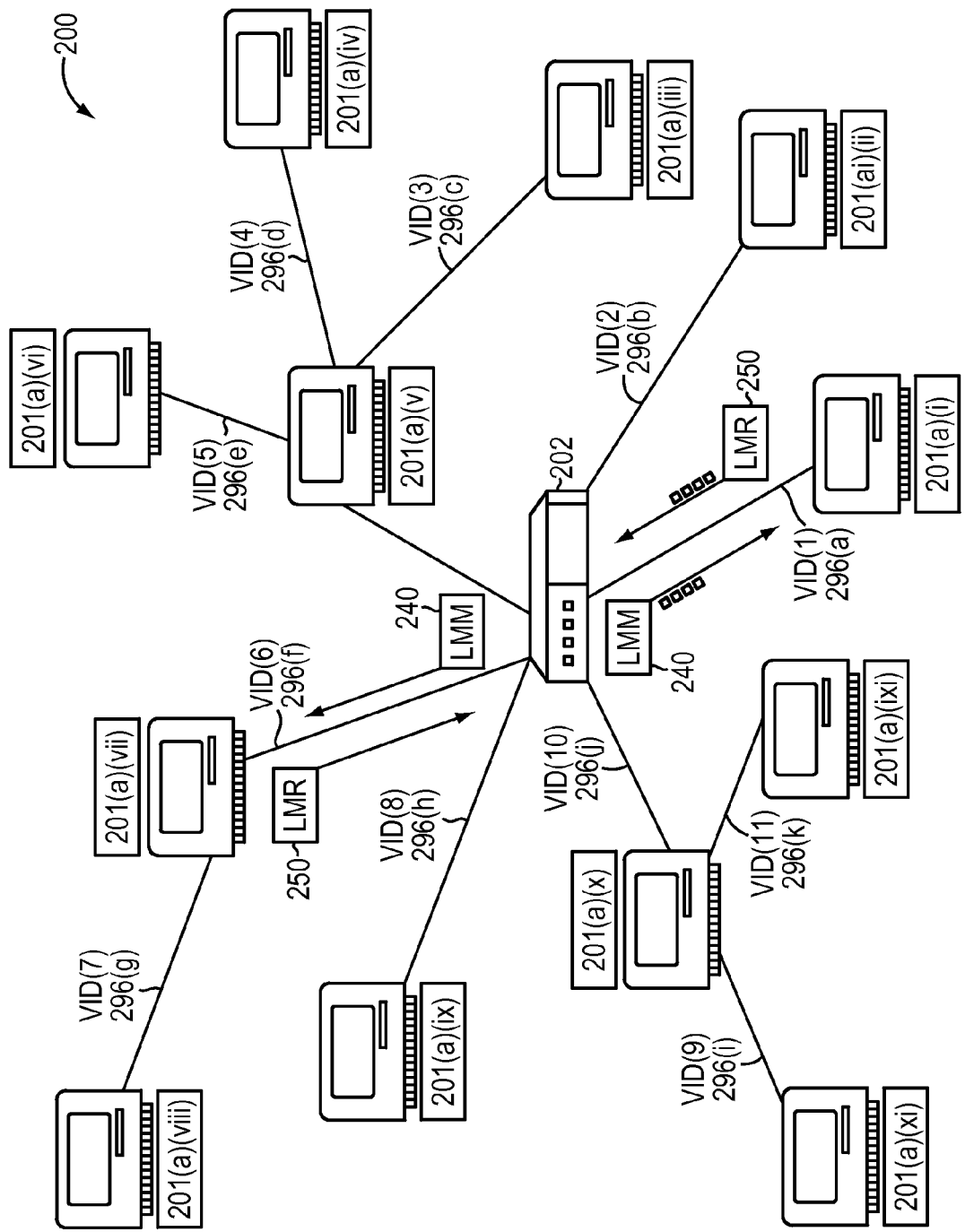
FIG. 2 is a network diagram illustrating a star topology that includes a plurality of network elements, where at least one network element is designated as a root node.

FIG. 2 is a network diagram illustrating a star topology 200 that includes a plurality of network elements 201(*a*)(i)-(xii), where at least one network element is designated as a root node 202. In this example embodiment the root node is provisioned as the master NE, and all leaf nodes in the network are provisioned as slave NEs. An example embodiment of the present invention, as illustrated in FIG. 2, includes a sharing of network element resources, such as a network resource or counters, among EVC and priorities in the network elements of a star topology.

In the example of FIG. 2, VLANs 296(*a*)-(*k*) are established or may be established among a group of NEs, i, ii, iii, . . . n, in the form of a star topology, and at least one NE that is a root of the star topology, either automatically provisioned as such, or manually assigned. In the example star topology 200, the root NE 202 may be identified as a master NE upon transmitting a first LMM 240 to a NE 201, which may be automatically provisioned as a slave NE to its peer (master NE) upon receiving the LMM 240, followed by transmitting a LMR 250 in response.

FIG. 2 further illustrates an example method to measure frame loss and frame loss ratio in a star topology. Frame loss measurement begins at one of the NEs, such as NE 202 designated as a root node, which, upon transmitting a first LMM 240, is provisioned as a master NE, in master mode. The master NE transmits the first LMM 240, which includes information, such as a first VLAN Identifier(1) (VID) and lowest priority bit=0 (p-bit) via VID(1) 296(*a*) to its peer NE, such as NE 201(*a*)(vii). FIG. 2 further illustrates the peer NE 201(*a*)(vii) receiving the LMM 240, at which point the peer NE 201(*a*)(vii) is automatically provisioned as the slave NE, to the master NE 202, in slave mode. The slave NE 201(*a*)(vii) compares the VID(1) and the p-bit of the received LMM information to the VID and priority of the slave NE's counter. If the received LMM information matches the VID and priority of the slave NE 201(*a*)(vii), then the slave NE sends an LMR 250 back to the master NE in response to the received LMM 240 with counted information included. However, if the VID and p-bit information in the LMM do not match the slave NE's VID and priority, the slave NE 201(*a*)(vii) updates its VID and the p-bit of its counter to match the VID and the p-bit to that of the received LMM and waiting for the next LMM, but not sending an LMR.

In the example embodiment of FIG. 2, the master NE 202 continues to transmit a plurality of LMMs 240 until the master NE receives sufficient LMRs 250 from the slave NE 201(*a*)(vii) to calculate near-end frame loss, far-end frame loss, near-end frame loss ratio, and far-end frame loss ratio, explained in more detail below. The calculated near-end frame loss, far-end frame loss, and near-end/far-end frame loss ratio are an example set of samples and can be used to update histogram bins (described in detail below).

The master NE then updates the priority to the next priority and repeats this method until all priorities are completed and counted, or some other action occurs. Then the master NE updates the VID to the next VID, such as VID(2)-VID(11), i.e., 296(*b*)-(*k*), and repeats the process of transmitting LMMs and receiving LMRs for each priority on each VLAN until all priorities and all VLANs have been counted.

Example embodiments of the present invention may exist for any network topology (not shown), such as a ring, mesh, hub topology, or other topology now existing or used in the future. The other network topologies may be partitioned into a group of sub-connections or sub-topologies that are similar to star topologies. Each such sub-connection group or sub-topology may identify one node as a root NE, and, thereby form a root NE group. The NEs in the root group may be identified by root node ID=1, 2, ... m, where m is the number of sub-connection groups. A protocol may be defined to coordinate between those root-nodes within the root group to repeat steps defined for a star topology such that all root nodes within the root node group complete their sample collection. Organization-specific information in the form of type, length, and value in OAM can be used to exchange root coordination information for root node coordination protocol to assure those root nodes are coordinated.

Figure 3:
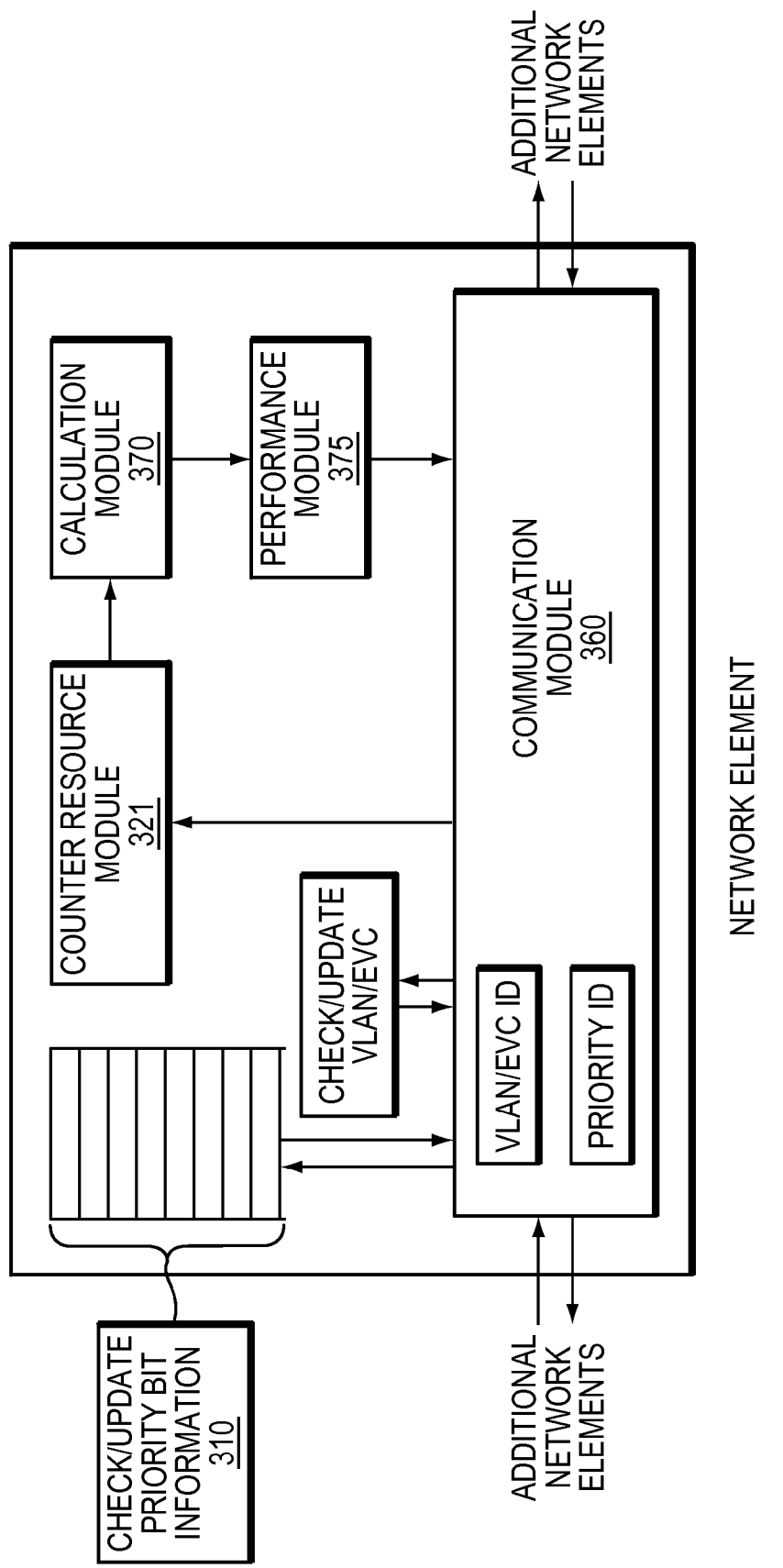
FIG. 3 is a block diagram illustrating a network element that includes a communication module, calculation module, performance module, and counter resource.

FIG. 3 is a block diagram illustrating a simplified network element (NE) 300 that includes a communication module 360, a calculation module 370, a performance module 375, and a counter resource module 321. The NE 300 shows a communication module 360 that receives information, such as data packets or frames, from an input from an external source, such as an additional NE, a head end node, an end-user, or other external source, that contains frame information, such as priority bits or VIDs. The communication module 360 may check or update priority bit information, that may be stored temporarily or permanently in a storage bin, such as a queue, memory, or buffer, and VLAN or EVC information as needed from time to time or for an interval and further provide such, and other, information to a counter resource module 321 for counting or maintaining frame information. The example embodiment of NE 300 also shows a calculation module 370 for determining frame parameters, such as frame loss and frame loss ratio, which, in turn, is used by a performance module 375 for determining and/or measuring performance of a network based on calculated frame parameters. Any or all of such information may be transmitted to or implemented by a memory or data storage for a histogram bin (not shown) for use in displaying network performance to a user, such as an operator, or to other network elements. The NE 300 may also contain an input and output port, queue, or buffer, as is customary in the art.

Figure 4:
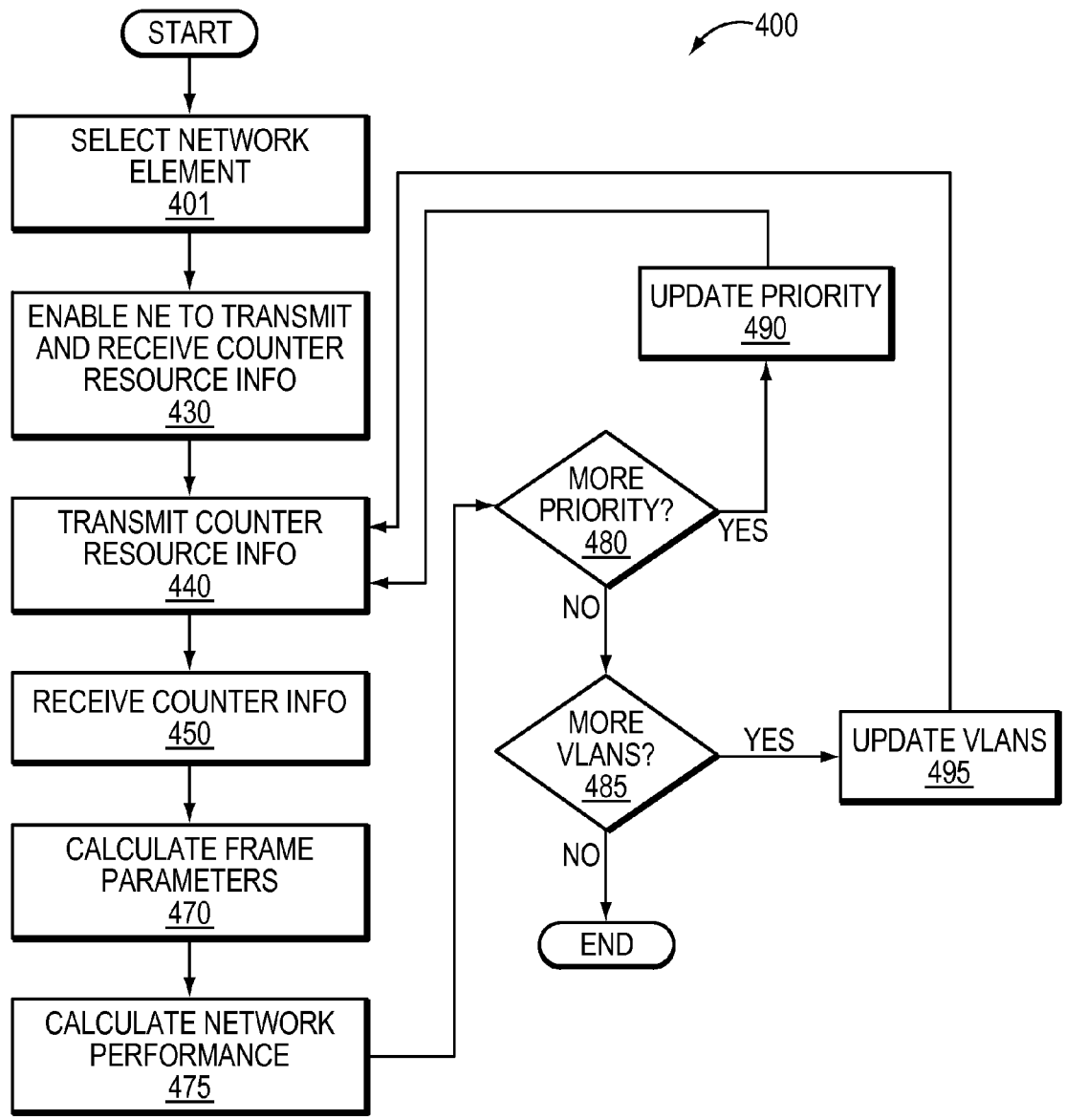
FIG. 4 is a flow diagram illustrating measuring an example embodiment of performance in a network according to the present invention.

FIG. 4 is a flow diagram representing an example embodiment of the present invention, illustrating how frame loss and frame loss ratio may be calculated and used to measure performance in a network. According to the example embodiment, a method 400 of a frame loss measurement process includes selecting a NE 401 as a master NE from among a plurality of NEs and enabling the NE 430 to transmit and receive counter resources information from a plurality of NEs. The method further includes transmitting 440 from the first NE counter resources information, such as a LMM, to a second NE and receiving 450 second counter resources information, such as a LMR, from the second NE. Upon receiving at least two sets of second counter information resources, the first NE uses the gathered counter resources information and calculates frame parameters 470, which may be used to measure performance in the network 475. The method further includes checking a priority 480 in a memory, such as a database, buffer, or other similar structure, for additional priorities; if more priorities exist, the operation cycles again, updating the priority 490, until all priorities have been checked and the frame loss measurement is performed for the corresponding priority and is calculated. If no more priorities exist, the method further checks for additional VLANs 485 that may exist; if more VLANs exist, the operation cycles again, updating the VLAN 495, until all VLANs have been checked and counted.

As in the above embodiments, selecting a NE 401 may include automatically or manually selecting the NE and may optionally further include automatically or manually provisioning the first selected NE as a master NE. Similar to the selecting of a NE 401, enabling a NE 430 to transmit and receive counter resources information, or other information that may be necessary or beneficial for measuring performance in the network, may include automatically or manually provisioning the NE in the enabled state.

Figure 5:
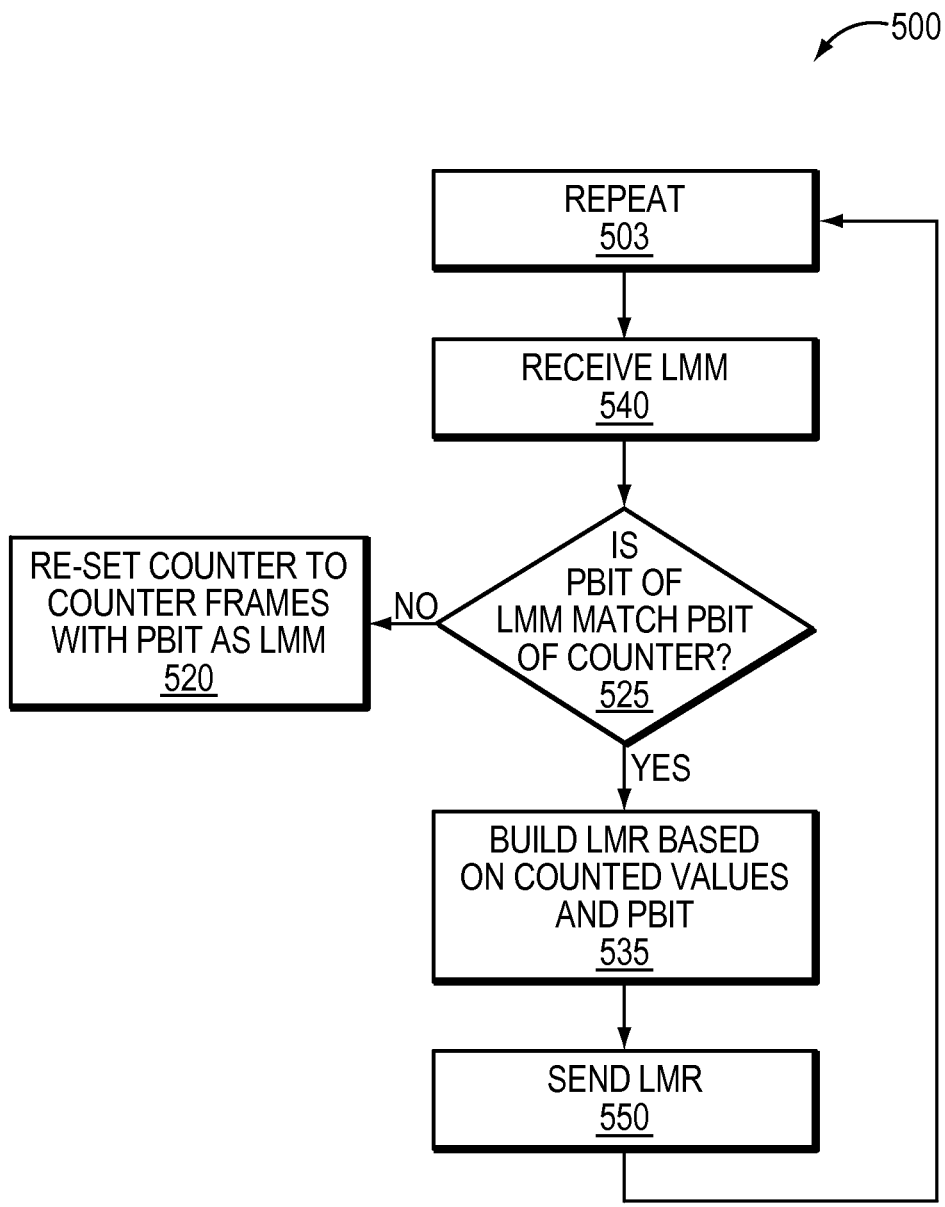
FIG. 5 is a flow diagram illustrating an embodiment of a network element provisioned in a slave mode set in a non-ready state.

FIG. 5 is a flow diagram illustrating how a network element, provisioned in a slave state, may receive and transmit messages to aid in frame loss and frame loss ratio measurement. In an example embodiment of the present invention, after a second NE is provisioned, either automatically or manually, and the first, master NE transmits a LMM, the second NE automatically becomes a slave NE to the master NE upon receipt of the LMM 540, which, if first initialized, transmission of LMMs may include an initial priority-bit (p-bit) set as zero (0). The slave NE may compare information, such as the p-bit of the received LMM, to the priority of its counter 525. If the received information does not match the slave NE's information, the slave NE changes or resets or sets the priority 520 of its counter to match the p-bit of the received LMM. Furthermore, if the received information does not match the slave NE's information, the slave NE only changes or resets the priority of its counter, as above; the slave NE does not continue to build and send a LMR at that state, but may await for an additional LMM to be received before continuing. However, if the information matches, the slave NE builds an OAM (e.g., LMR) based on the counted values and p-bit 535 and transmits the LMR 550 to the master NE.

The method further includes the master NE repeating the messaging cycle 503 by continuing to send LMMs until it receives sufficient LMRs from its slave NE to calculate (not shown) near-end frame loss, near-end frame loss ratio, far-end frame loss, and far-end frame loss ratio, or other such frame parameters that may be useful for determining network performance, as one set of samples that may be used to update the histogram bins. Continuing to refer to FIG. 5, prior to repeating at 503, the master NE will increase the CoS (not shown) to the next CoS and transmit a second LMM 540 with the new p-bit to be received by the slave NE. The master NE will repeat the method 500 until the master NE receives at least a second LMR 550 from the slave NE. Upon receiving at least the second LMR from the slave NE, the master NE calculates (not shown) frame parameters from the provided information.

Figure 6:
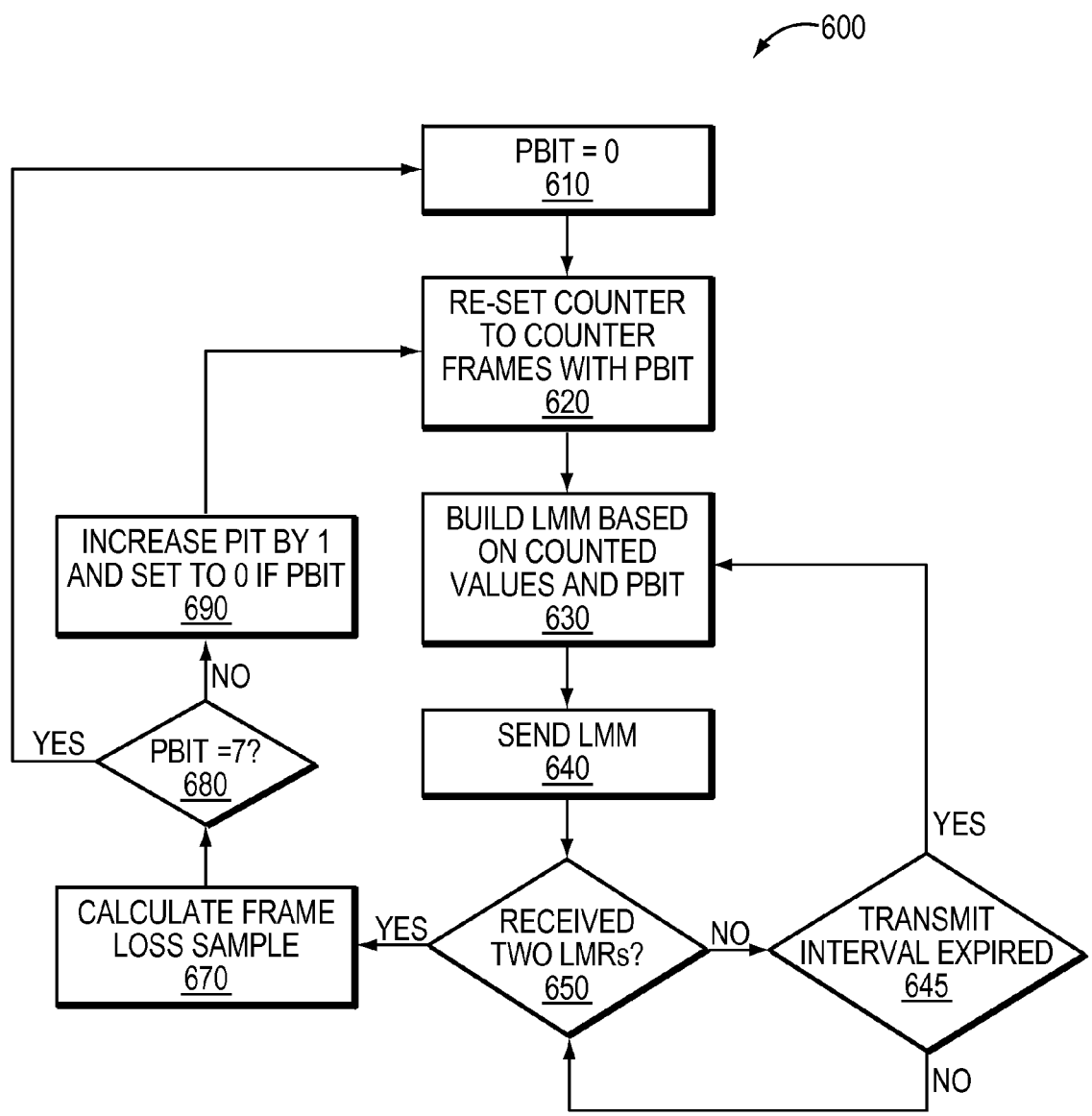
FIG. 6 is a flow diagram illustrating an embodiment of a network element provisioned in a master mode set in a transmitting state.

FIG. 6 is a flow diagram 600 illustrating how a counter resource of a network element, such as the network element of FIG. 3, may be shared to calculate a frame loss or frame loss ratio sample based on LMMs transmitted from a first NE provisioned in master mode to a second NE provisioned as a peer to the first NE and set in slave mode. An example embodiment of the present invention is disclosed as sharing counters, such as frame counters, between priorities for a plurality of EVCs. For each EVC, the counter resources, such as frame counters, are set to count the number of frames beginning with the lowest priority-bit (p-bit), i.e., p-bit=0, or CoS, when frame loss and/or frame loss ratio measurement is enabled for both network elements in a pair of network elements in a network. According to the example embodiment, a method 400 of a network element in master mode includes beginning with a p-bit equal to zero 610 and resetting a first counter 620 at the master NE to count frames with that p-bit. The example embodiment of the method further includes building an LMM 630 based on the counted values and the p-bit and transmitting 640 the built LMM to the NE in slave mode. The method further includes determining 650 if the master NE has received two or more LMRs from the slave NE.

If two or more LMRs have not been received by the master NE, the method further includes determining if a transmit interval has expired 645. If not expired, the method again determines if the master NE has received two or more LMRs 650. However, if the transmit interval has expired, then the method returns to build 630 another LMM based on counted values and the p-bit, transmits the LMM 640 to the slave NE and further checks to determine if two or more LMRs have been received 650 at the master NE. If two or more LMRs have been received, the master NE calculates a frame parameters sample 670. The method further determines if the p-bit equals seven (7) 680; if it does, the method 400 is complete for that p-bit. If the p-bit is determined not to equal seven (7), then the method increase the p-bit by one 690 and continues through steps 620 to 680 until the p-bit equals seven (7) and is complete for that priority.

It is normally required to collect frame loss or frame loss ratio samples in a given time interval to generate a histogram diagram. The histogram diagram (not shown) may be a group of bins B(i), with each bin defined as two boundary points B(i)=[S(i), S(i+1)]. If the sample (frame loss ratio or frame loss) has a number between [S(i), S(i+1)], B(i) will be incremented by 1. It is expected to collect those frame loss or frame loss ratio samples for all EVCs and all priorities for a given time interval, e.g., a 5 minute interval, a 15 minute interval, 24 hour interval, etc.).

Figure 7:
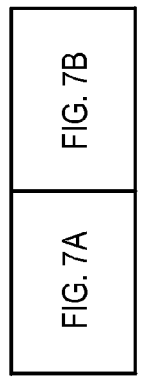
FIG. 7 is a diagrammatic model of an example of a frame format.
Figure 7A:
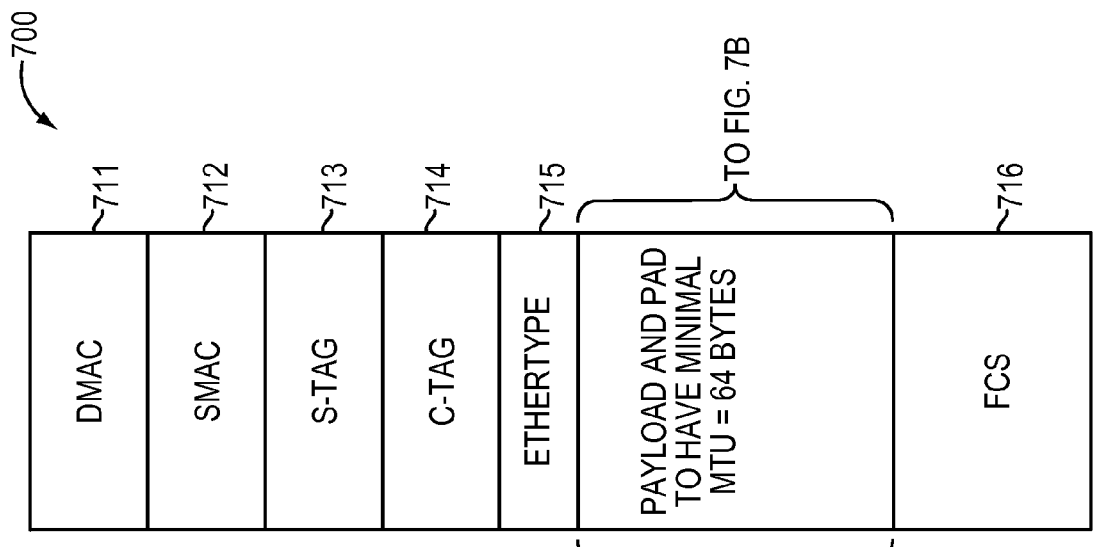
Figure 7B:
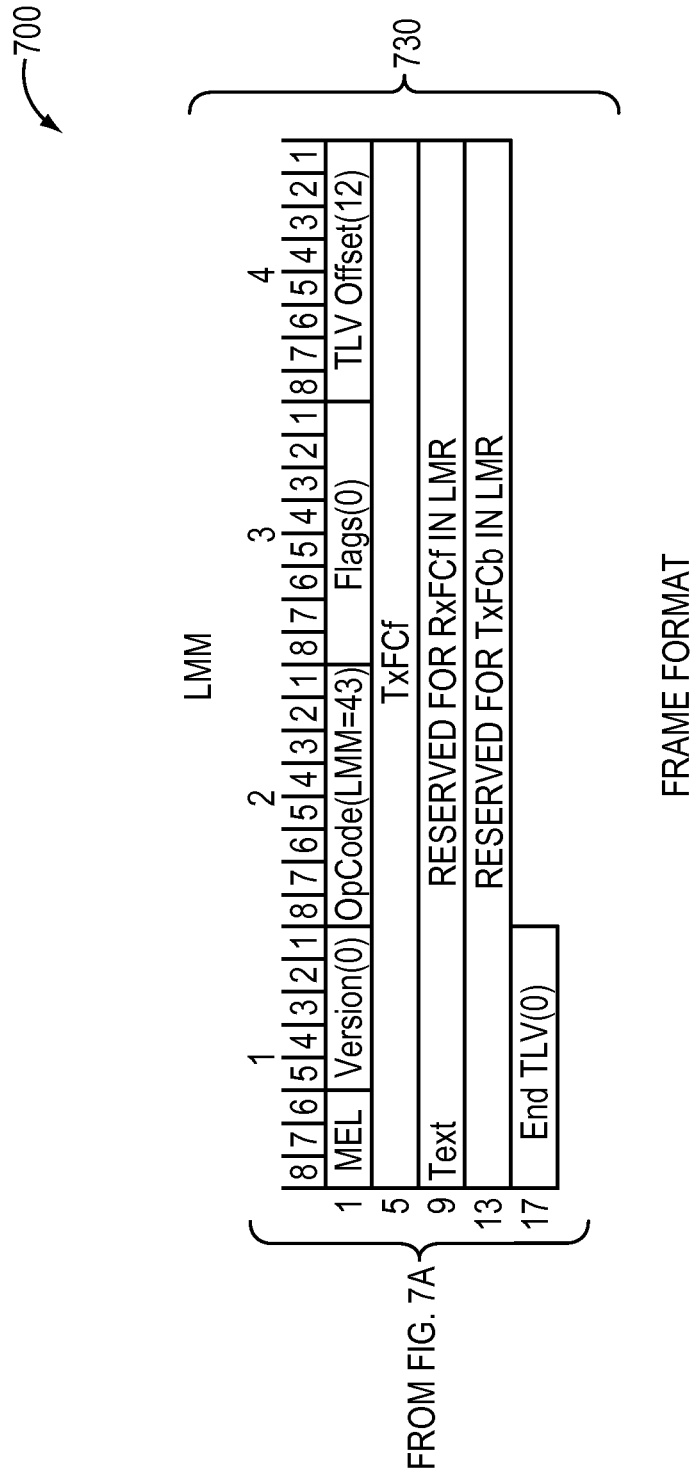

FIG. 7 is a diagrammatic model of an example of a frame format 700. The example frame includes possible components carried in the frame 700. Frame 700 may include a DMAC 711 representing a destination Media Access Control (MAC) address, which may be used to identify a recipient, such as an end-user or next network element and a SMAC 712 representing a source MAC address, which may be used by a receiving device. The example embodiment of frame 700 further includes a S-TAG 713 representing a service tag, a C-TAG 714 representing a customer tag, and an Ethertype 715 representing which protocol is encapsulated in the payload of the Ethernet frame. The example embodiment further includes at least one LMR 735 or LMM 730, which may be exchanged by transmission and receipt, and contain information that may be included and/or used in calculating frame parameters. Frame 700's tail is a FCS 716 representing Frame Check Sequences, which allow for bits to be added to the end of a frame for error detection purposes.

Figure 8:
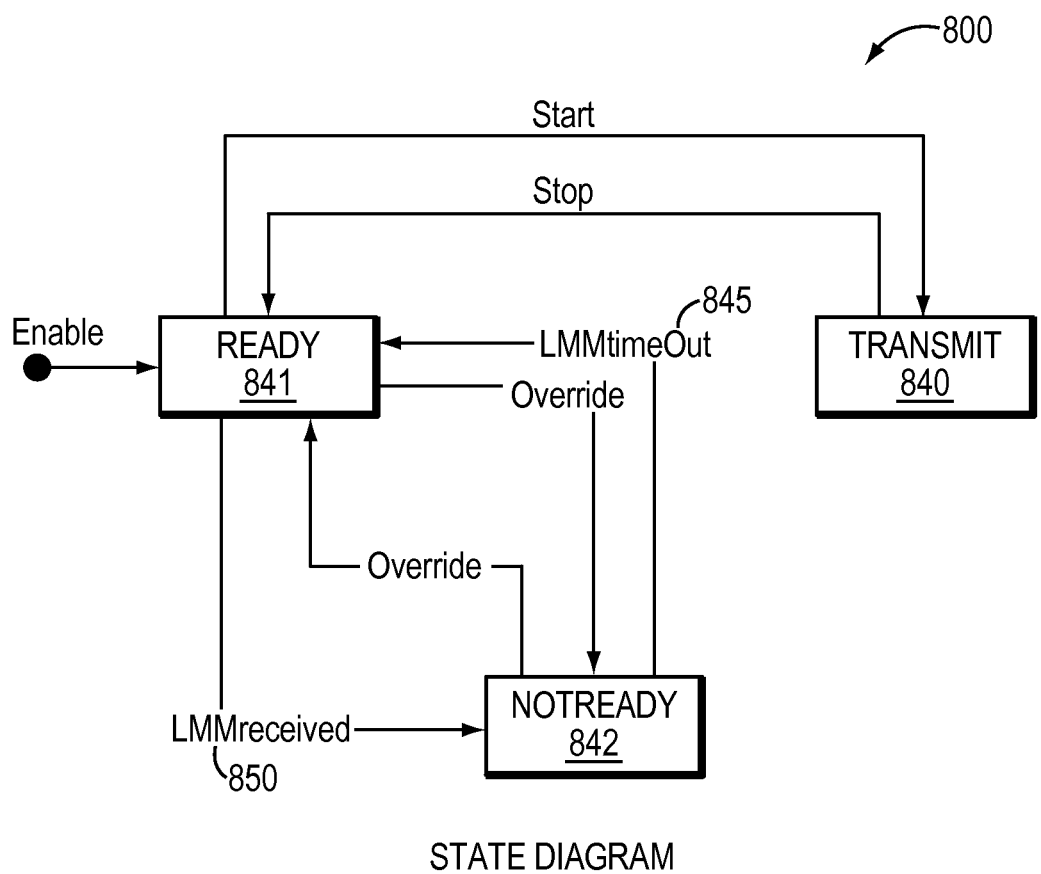
FIG. 8 is a diagrammatic view of an illustrative state diagram model enabling transmission and receipt of Operations, Administrations, and Maintenance (OAM) frames.

FIG. 8 is a diagrammatic view of an illustrative state diagram model 800 enabling transmission and receipt of OAM frames for use in calculating frame parameters and measuring performance in a network. In an example embodiment of the present invention, two network resources, such as counters, may be included in the network elements that are enabled to transmit and receive frames. For example, a first counter in a first NE, Counter (TxFC) may be enabled per VLAN/EVC, per CoS/priority, and per port for counting transmitted data frames. Additionally, a second counter in a second NE, Counter (RxFC) may be enabled per VLAN/EVC, per CoS/priority, and per port for counting received data frames.

In some example embodiments, such as an embodiment that enables a single-end Ethernet Loss Measurement function (ETH-LM), if a slave NE is enabled or set in a ready state 841, which may be overridden to a notReady state 842, and a LMM is received at the slave NE 850, then the state of the slave NE enters or transitions to a notReady state 842, which can be overridden to the ready state 841, or back to ready state after reaching an LMM timeout state 845, as exemplified in the state table below.

TABLE 1

| | REQUEST (Command and Event) | | | | |
|---|---|---|---|---|---|
| STATE | start | stop | override | LMMrecieved | LMMtimeOut |
| ready | transmit | n/a | notReady | notReady | n/a |
| noReady | n/a | n/a | ready | n/a | ready |
| Transmit | n/a | ready | n/a | n/a | n/a | n/a: no state changes, stay in the same state or not happen in that state

If the slave NE is in a ready state 841, the master NE transmits an LMM PDU per VLAN/EVC per CoS/priority per port at a given period, where TxFCf is a value of the local counter TxFC at the time of transmission of the LMM frame (f). Next, the slave NE transmits the LMR PDU per VLAN/EVC per CoS/priority per port in response to the LMM received, where TxFCf is a value of TxFCf copied from the LMM frame, where RxFCf is a value of the local counter RxFCl at the time of LMM frame reception, and where TxFCb is a value of the local counter TxFCl at the time of transmission of the LMR frame. When the master NE receives a sufficient number of LMRs, at least two, the master NE calculates a frame loss based on the at least two received LMRs at $t_p$ and $t_c$ (times), where far-end frame loss is calculated by the mathematical equation: $|TxFCb[t_c]-TxFCb[t_p]|-|RxFCb[t_c]-RxFCb[t_p]|$ and near-end frame loss is calculated by the mathematical equation: $|TxFCf[t_c]-TxFCf[t_p]|-|RxFCl[t_c]-RxFCl[t_p]|$.

In a first example embodiment of a state, Case 1, referring to FIG. 1, the master NE 110 may be connected to the slave NE 120 via a VLAN 101 or an EVC (not shown). In this example embodiment, the master NE and the slave NE are both set in priority sharing mode, with one of the NEs as the master NE transmitting LMM only and another one of the NEs as the slave NE transmitting a LMR in response a to LMM only. The master and slave NEs may exist in one of three states, including: ready, notReady, or transmit and be responsive to one of three commands, including: start, stop, or override. The master and slave NEs may receive one of two events, including a LMM being received (LMMreceived) or an LMM timing out (LMMtimeOut), where no LMM is received for a configurable time (see Table 1).

In the example embodiment of Case 1, if the state action is set in transmit state, the master NE may set a p-bit, from lowest p-bit to highest p-bit, setting counters per the p-bit, and transmitting an LMM with values from counters and p-bit at a given period or interval until sufficient LMRs (at least two) are received from the slave NE, in response to the LMMs, to calculate frame loss samples for the near-end and the far-end.

Further in the example embodiment of Case 1, if the state action is set in notReady state, the slave NE may compare the p-bit of the received LMM with p-bit of the slave NE's counter to determine if the p-bits match. If matched, the slave NE may transmit a LMR with values from its counter; however, if not matched, the slave NE may set its counter per the p-bit of the received LMM but may not send a LMR until the slave NE receives the next LMM from the master NE.

Furthermore, in the example embodiment of Case 1, if both NEs receive a start command at the same time, the master NE will enter transmit state, but the slave NE will deny the command. In this case, there is no lock situation.

In a second example embodiment, Case 2, a first NE 110 may be connected to a second NE 120 via a VLAN 101. In this example embodiment, both the first NE and the second NE are set in priority sharing mode, with both of the first NE 110 and the second NE 120 transmitting LMMs and transmitting LMRs in response to the LMMs, such that no NE is provisioned as a master NE and no NE is provisioned as a slave NE.

In the example embodiment of Case 2, if the state action is set in transmit state, one of the first NE and second NEs may set a p-bit, from lowest p-bit to highest p-bit, setting a counter per the p-bit, and transmitting a LMM with values from the counter and p-bit at a given period or interval to the other of the first and second NE, until sufficient LMRs (at least two), are received from the other of the first and second NE in response to the LMMs, to calculate frame parameters, such as frame loss samples for the near-end and/or the far-end.

Further in the example embodiment of Case 2, if the state action is set in notReady state, the other of the first and second NEs may compare the p-bit of the received LMM with the p-bit of the other of the first and second NE's counters to determine if the p-bits of the first and second NEs match. If matched, the other of the first and second NEs may transmit a LMR with values from its counter; however, if not matched, the other of the first and second NEs may set its counter per the p-bit of the received LMM, but may not send a LMR until the other NE receives the next LMM from the first NE.

Furthermore in the example embodiment of Case 2, if both NEs receive a start command at the same time and both NEs will enter a transmit state, known as a locking situation, and no LMR is received at either NE, then, after a period of time or an interval, both NEs may raise a notification that signals that the operator needs to issue a stop command to one NE to reset that NE from a transmit state to a ready state.

In a third example embodiment, Case 3, a first NE is set in priority sharing more and a second NE is not set in priority sharing mode, but has counter resources for all priorities such that the first NE transmits LMMs only and the second NE transmits LMRs in response to the received LMMs only.

In the example embodiment of Case 3, if the state action is set in transmit state, the first NE may transmit a p-bit, from lowest p-bit to highest p-bit, setting counters per the p-bit transmitted, and transmitting a LMM with values from counters and p-bit at a given period or interval until sufficient LMRs (at least two) are received from the second NE in response to the LMMs, to calculate frame loss samples for the near-end and/or the far-end.

Further in the example embodiment of Case 3, unlike Cases 2 or 3, the first NE may never be provisioned or enter a notReady state. However, in Case 3, if the second NE transmits a LMM, it enters a locking situation where the first NE, if in a transmit state, may not be transitioned to a notReady state, but where the first NE is set in a ready state, it may be transitioned to a notReady state (as explained in more detail below).

In a fourth example embodiment, Case 4, the first NE is set in priority sharing mode and the second NE is not set in priority sharing mode, such that the second NE transmits LMMs only and the first NE transmits LMRs only.

In the example embodiment of Case 4, if the first NE is set in the notReady state, the first NE may compare the p-bit of the received LMM with the p-bit of the first NE's counter. If matched, the first NE may transmit a LMR with values from the first NE's counter to the second NE. However, if not matched, the first NE may set its counter per the p-bit of the received LMM, without transmitting a LMR, and enter a p-bit cycle mode with the current p-bit set. Further in the example embodiment of Case 4, if the state action is set in cycle mode, the first NE, starting with the current p-bit value, may adjust its counter to match the p-bit of the LMM, if it did not match, and transmit a LMR with a configurable number. The first NE may then set the p-bit to the next p-bit, if available, and repeat the cycle until all p-bit values are processed.

In a fifth example embodiment, Case 5, a first NE is set in priority sharing mode and a second NE is not set in priority sharing mode, such that both the first NE and the second NE may transmit both LMMs and LMRs.

In the example embodiment of Case 5, if the first NE is set in a notReady state, the first NE may compare the p-bit of the received LMM with the p-bit of the first NE's counter. If matched, the first NE may transmit a LMR with values from the first NE's counter to the second NE, which may calculate frame parameters based on the received LMRs. However, if not matched, the first NE, in the notReady state, may set its counter per the p-bit of the received LMM without transmitting a LMR, and enter a p-bit cycle mode with the current p-bit set. Further in the example embodiment of Case 5, if the state action is set in cycle mode, the first NE, starting with the current p-bit, may adjust its counter to match the p-bit of the LMM, if it did not match, and transmit a LMR with a configurable number to the second NE, which may calculate frame parameters, such as frame loss and/or frame loss ration measurements, based on the received LMRs. The first NE may then set the current p-bit to the next p-bit, if available, and restart the cycle.

Further example embodiments of the present invention may include a non-transitory computer readable medium containing instruction that may be executed by a processor, and, when executed, cause the processor to monitor the information, such as components or status, of at least a first and second network element. It should be understood that elements of the block and flow diagrams described herein may be implemented in software, hardware, firmware, or other similar medium determined in the future. In addition, the elements of the block and flow diagrams described herein may be combined or divided in any manner in software, hardware, or firmware. If implemented in software, the software may be written in any language that can support the example embodiments disclosed herein. The software may be stored in any form of computer readable medium, such as random access memory (RAM), read only memory (ROM), compact disk read only memory (CD-ROM), and so forth. In operation, a general purpose or application specific processor loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments of the invention.

Any element in a claim that does not explicitly state "means for" performing a specified function, or "step for" performing a specific function, is not to be interpreted as a "means" or "step" clause as specified by 35 U.S.C. §112, para. 6. In particular, the use of "step of" in the claims herein is not intended to invoke the provisions of 35 U.S.C. §112, para. 6.

While this invention has been particularly shown and described with references to example embodiments thereof, it will be understood by those skilled in the art that various changes in form and details may be made therein without departing from the scope of the invention encompassed by the appended claims.

What is claimed is:

1. A method of measuring performance in a network, the method comprising:
    enabling a first network element to transmit and receive information regarding counter resources to and from a second network element, the counter resources being shared among a plurality of Class of Service (CoS) of a virtual local area network (VLAN) or Ethernet Virtual Connection (EVC), each of the plurality of CoS at least used to determine which outbound queue an outbound packet uses;
    for each CoS, (i) transmitting, from the first network element to the second network element, first counter resources information determined at the first network element, and (ii) receiving at the first network element, second counter resources information determined at the second network element;
    calculating frame parameters for each CoS at the first network element as a function of the first and second counter resources information; and
    measuring for each CoS the performance in the network based on the calculated frame parameters.

2. The method of claim 1 wherein transmitting the first counter resources information includes transmitting a lost measurement message (LMM), and wherein receiving the second counter resources information includes receiving a lost measurement response (LMR).

3. The method of claim 2 wherein the first network element is a master and the second network element is a slave.

4. The method of claim 1 wherein the first and second network elements are arranged in a star network topology, and wherein the first network element is a root of the star network topology.

5. The method of claim 1 wherein the first and second network elements are part of a mesh network topology, and further including segmenting the mesh network topology into a plurality of star topologies.

6. The method of claim 1 wherein the network includes a plurality of VLANs, and wherein the counter resources are shared among the plurality of VLANs.

7. The method of claim 1 wherein the counter resources include a first and a second counter resource associated with the VLAN, the first counter resource further associated with the first network element, and the second counter resource further associated with the second network element.

8. The method of claim 1 wherein calculating the frame parameters includes calculating a frame loss ratio or frame loss measurement.

9. The method of claim 1 wherein both the first and second network elements are enabled in a CoS sharing mode, wherein one of the network elements is configured to transmit a lost measurement message (LMM) and the other network element is configured to transmit a lost measurement reply (LMR) in response to the LMM.

10. The method of claim 1 wherein transmitting the first counter resources information and receiving the second counter resources information includes:
    (a) setting a VLAN identifier (VID) of a lost measurement message (LMM) to indicate the VLAN;
    (b) setting a priority-bit (p-bit) of the LMM to indicate a first CoS;
    (c) transmitting the LMM to the second network element;
    (d) comparing the VID and the p-bit of the LMM to a VID and p-bit of the second counter resource;
    (e) determining if the VID and the p-bit of the LMM are equal to the VID and the p-bit of the second counter resource;
    (f) if equal, generating a lost measurement reply (LMR) and transmitting the LMR to the first network element, and if not equal, changing the VID and p-bit of the second counter resource to equal the VID and p-bit of the LMM;
    (g) receiving the LMR at the first network element;
    (h) repeating (c)-(g) until the first network element receives at least two LMRs from the second network element;
    (i) calculating, for the CoS indicated by the p-bit, a near-end frame loss and a far-end frame loss;
    (j) updating the p-bit of the next LMM to indicate a next CoS;
    (k) repeating (c)-(j) for each CoS.

11. The method of claim 10 wherein calculating the frame parameters further includes repeating (a)-(k) for a plurality of VLANs in a case of the plurality of VLANs sharing the counter resources.

12. The method of claim 10 wherein calculating the near-end frame loss measurement includes calculating a difference between (i) a number of frames transmitted from the first network element during a given time period, the given time period based on transmission time of LMMs and (ii) a number of frames received from the second network element during the given time period.

13. The method of claim 10 wherein calculating the far-end frame loss measurement includes calculating a difference between (i) a number of frames transmitted from the first network element during a given time period, the given time period based on transmission time of LMRs and (ii) a number of frames received from the second network element during the given time period.

14. A network element for measuring performance in a network, the network element including:
    a first counter resource shared among a plurality of CoS of a Virtual Local Area Network (VLAN), each of the plurality of CoS at least used to determine which outbound queue an outbound packet uses;
    a communication module configured to (i) transmit, for each CoS, information regarding the first counter resource and (ii) receive, from another network element, information regarding a second counter resource shared among the plurality of CoS;
    a calculation module configured to calculate, for each CoS, frame parameters as a function of the first and second counter resources information; and
    a performance module configured to measure, for each CoS, the performance in the network based on the calculated frame parameters.

15. The network element of claim 14 wherein the first and second counter resources are shared among the plurality of CoS of a plurality of VLANs.

16. The network element of claim 14 wherein the first and second counter resources are associated with a plurality of CoS of a plurality of VLANs, each first counter resource associated with the first network element and each second counter resource associated with the second network element.

17. The network element of claim 14 wherein the network element is a root node of a star network topology.

18. The network element of claim 14 wherein the network element is part of mesh network topology, the mesh network topology being separable into a plurality of star topologies.

19. The network element of claim 14 wherein the communication module is configured to transmit lost measurement messages (LMMs) and receive lost measurement responses (LMRs).

20. The network element of claim 14 wherein the calculation module is configured to calculate a frame loss ratio or a frame loss measurement.

21. A computer program product comprising a non-transitory computer readable medium having computer readable code stored thereon, which, when executed by a processor, causes the processor to:
 enable a first network element to transmit and receive information regarding counter resources to and from a second network element, at least one counter resource being shared among a plurality of CoS of a virtual local area network (VLAN), each of the plurality CoS at least used to determine which outbound queue an outbound packet uses;
 for each CoS, (i) transmit, from the first network element to the second network element, first counter resources information determined at the first network element, and (ii) receive, at the first network element, second counter resources information determined at the second network element;
 calculate frame parameters for each CoS at the first network element as a function of the first and second counter resources information; and
 measure, for each CoS, the performance in the network based on the frame parameters.

\* \* \* \* \*